Patented Mar. 27, 1923.

1,449,833

UNITED STATES PATENT OFFICE.

HOWARD OTTO PARKER, OF MIDLAND, PENNSYLVANIA.

PROCESS OF REGENERATING LEAD STORAGE BATTERIES.

No Drawing. Application filed August 13, 1920. Serial No. 403,387.

*To all whom it may concern:*

Be it known that I, HOWARD OTTO PARKER, a citizen of the United States, and a resident of Midland, in the county of Beaver and State of Pennsylvania, have invented certain new and useful Improvements in Processes of Regenerating Lead Storage Batteries, of which the following is a specification.

This invention relates to an improved process for regenerating or desulphating sulphated lead storage batteries and the object thereof is to provide a simple and economical process, by which sulphated batteries or batteries which have lost their efficiency, can be restored economically to normal or practically normal condition and efficiency, thus permitting indefinite or re-use of batteries which might otherwise be discarded.

In accordance with the present process, the sulphuric acid ($H_2SO_4$) is removed from the cell or cells to be treated, that is, the sulphated lead storage batteries, and then the cells are washed thoroughly in pure water ($H_2O$) about four times, leaving the water stand in the cells about ten minutes at each washing.

After the cells have been washed as above stated, the same are filled with an hydroxide solution, preferably sodium hydroxide (NaOH) or potassium hydroxide (KOH), said solution being about 5% solution by weight in water. The battery is then charged with normal amperage until the solution becomes acid, test being made with litmus or phenolphthalein, which will determine acidity.

Should the negative plates be badly sulphated or coated, an alternate charge and discharge will be necessary to remove this condition. This is not ordinarily necessary as the positive plates are always affected first. Care must be taken however, not to charge in the negative direction too long, as it tends to change polarity and reduce efficiency. The solution is removed after this operation and these steps repeated from one to five times, until the cell regains its efficiency, depending on the condition of the plates. Care must be taken to wash the cell carefully each time with pure water, letting the water stand in the cell for ten minutes or longer.

The original sulphuric acid is then replaced if clear, but if not, it must be substituted by a new solution. If the original sulphuric acid is clear, and of the proper specific gravity, it may be used with efficiency and the cell charged in the ordinary manner.

In accordance with the above process, batteries which have become inactive due to sulphating, may be cleaned and re-used, especial importance attaching to the electrolytic action of the hydroxide on the sulphate, causing it to be removed by the hydroxide in the presence of the electric current. All spots are removed from the plates, leaving them as bright a color and in as active a condition as when new. The batteries are in most cases returned to original efficiency and capacity, the only exception being where a portion of the plates have been entirely removed by breakage, freezing or other causes. All sediment in the bottom of the cells is also removed, and the process may be inexpensively and rapidly carried out, the total expense of treating being under three percent of the cost of the battery and the time required for treating and fully charging not exceeding the ordinary time for charging more than ten hours.

In view of the foregoing, it is thought that the operation of the device will be readily understood and in view of the simplicity and practical value, that it will commend itself to those skilled in the art.

Having thus described my invention, what I claim is:—

1. A process for regenerating lead storage batteries consisting in removing the acid therefrom, thoroughly cleaning and washing the cell and plate with pure water a series of times, allowing the same to stand after each washing, filling the same with a solution of potassium hydroxide of about 5% solution by weight in water, subjecting the electrodes to electrolysis in the solution of the hydroxide a series of times and again washing the same after each electrolytic action.

2. The process of regenerating lead storage batteries, consisting in removing the sulphuric acid therefrom, washing the same with pure water, filling the same with a solution of an hydroxide, and charging the battery until the solution becomes acid.

3. The process of regenerating lead storage batteries, consisting in removing the sulphuric acid therefrom, washing the same with pure water, filling the same with a solution of an hydroxide, charging the battery with normal amperage until the solution becomes acid by test and alternately discharging the same to clean the negative plates of the battery.

4. The process of desulphating sulphated lead storage batteries consisting in passing an electric current through a solution of an hydroxide with which the cells are filled a series of times after removing the sulphuric acid therefrom and washing after each time.

5. The process of desulphating sulphated lead storage batteries consisting of removing the acid from the cells, cleansing the same several times with pure water and allowing the cells to stand at each washing, filling the same with a solution of an hydroxide, about five percent solution by weight in water, and then passing an electric current of normal amperage through the solution to charge the battery in the presence of the sulphate.

6. The process of desulphating sulphated lead storage batteries consisting of removing the acid from the cells, washing the same several times with pure water and allowing the cells to stand at each washing, filling the same with a solution of a hydroxide, about 5% solution by weight in water, and then passing an electric current through the solution to charge the battery in the presence of the sulphate.

7. A process for regenerating lead storage batteries consisting in desulphating the same after the removal of the acid therefrom, thoroughly washing the same with pure water and allowing them to stand about ten minutes after the washing, filling the same with an hydroxide solution and then treating the battery and solution until the solution becomes acid.

HOWARD OTTO PARKER.